(12) United States Patent
Wagner et al.

(10) Patent No.: US 8,688,757 B2
(45) Date of Patent: Apr. 1, 2014

(54) METHOD AND SYSTEM OF SUBSURFACE HORIZON ASSIGNMENT

(75) Inventors: Robert R. Wagner, Richmond, TX (US); Xuewei Tan, Sugar Land, TX (US); Zhibo Chen, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/883,733

(22) PCT Filed: Sep. 12, 2012

(86) PCT No.: PCT/US2012/054730
§ 371 (c)(1),
(2), (4) Date: May 6, 2013

(87) PCT Pub. No.: WO2013/039953
PCT Pub. Date: Mar. 21, 2013

(65) Prior Publication Data
US 2013/0226968 A1    Aug. 29, 2013

Related U.S. Application Data

(60) Provisional application No. 61/535,567, filed on Sep. 16, 2011.

(51) Int. Cl.
*G06F 17/30* (2006.01)
*G06F 17/00* (2006.01)

(52) U.S. Cl.
USPC ............... 707/899; 367/14; 367/38; 367/73; 702/13; 702/14

(58) Field of Classification Search
USPC .............. 707/899; 367/38, 14, 73; 702/13–14
See application file for complete search history.

(56) References Cited

U.S. PATENT DOCUMENTS

| | | | |
|---|---|---|---|
| 5,153,858 A | 10/1992 | Hildebrand | |
| 5,251,184 A | 10/1993 | Hildebrand et al. | |
| 5,432,751 A | 7/1995 | Hildebrand | |
| 5,615,171 A | 3/1997 | Hildebrand | |
| 5,671,344 A | 9/1997 | Stark | |
| 6,463,387 B1 | 10/2002 | Runnestrand et al. | |
| 6,516,274 B2 | 2/2003 | Cheng et al. | |
| 6,757,615 B2 | 6/2004 | Zauderer et al. | |
| 7,519,476 B1 | 4/2009 | Tnacheri et al. | |
| 8,213,261 B2 * | 7/2012 | Imhof et al. | 367/38 |
| 2002/0042678 A1 | 4/2002 | Bevc et al. | |
| 2006/0129359 A1 | 6/2006 | Dulac et al. | |

(Continued)

OTHER PUBLICATIONS

International Search Report and Written Opinion issued Feb. 18, 2013 in International Patent Application No. PCT/US2012/054730, filed Sep. 12, 2012.

*Primary Examiner* — Yicun Wu
(74) *Attorney, Agent, or Firm* — Mark E. Scott; Bradley Misley Conley Rose, PC

(57) ABSTRACT

Subsurface horizon assignment. At least some of the illustrative embodiments are methods including: obtaining, by a computer system, a seismic data volume; identifying, by the computer system, a plurality of patches in the seismic data volume, and the identifying thereby creating a patch volume; displaying, on a display device, at least a portion of the seismic data volume and the plurality of patches of the patch volume; and assigning a patch of the plurality of patches to a subsurface horizon of the seismic data volume.

21 Claims, 6 Drawing Sheets

(56) References Cited

U.S. PATENT DOCUMENTS

| | | |
|---|---|---|
| 2008/0177476 A1 | 7/2008 | Klein et al. |
| 2010/0214870 A1 | 8/2010 | Pepper et al. |
| 2011/0048731 A1 | 3/2011 | Imhof et al. |
| 2011/0118985 A1 | 5/2011 | Aarre |
| 2011/0307178 A1 | 12/2011 | Hoekstra |

* cited by examiner

METHOD AND SYSTEM OF SUBSURFACE HORIZON ASSIGNMENT

CROSS-REFERENCE TO RELATED APPLICATIONS

None.

BACKGROUND

In the computer age, hydrocarbon exploration is based on a vast array of information—from the data associated with one or more seismic surveys to the information associated with exploratory boreholes. In terms of information evaluation, one of the more difficult operations is analysis of a seismic data set to determine the subsurface "horizons" of interest. A geologist may spend days or even weeks analyzing a set of seismic data to find the horizons of interest (e.g., the horizons between which hydrocarbons may be trapped). When one considers that multiple seismic surveys of potential hydrocarbon bearing formations may be made before the first borehole is drilled, and that even a single set of data from a seismic exploration can be post-processed to present the data in different ways (e.g., near stack, far stack), the amount of time needed to fully analyze the data can be enormous.

Any process or method that reduces the amount of time used to identify and assign horizons in seismic data would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Figure 1:
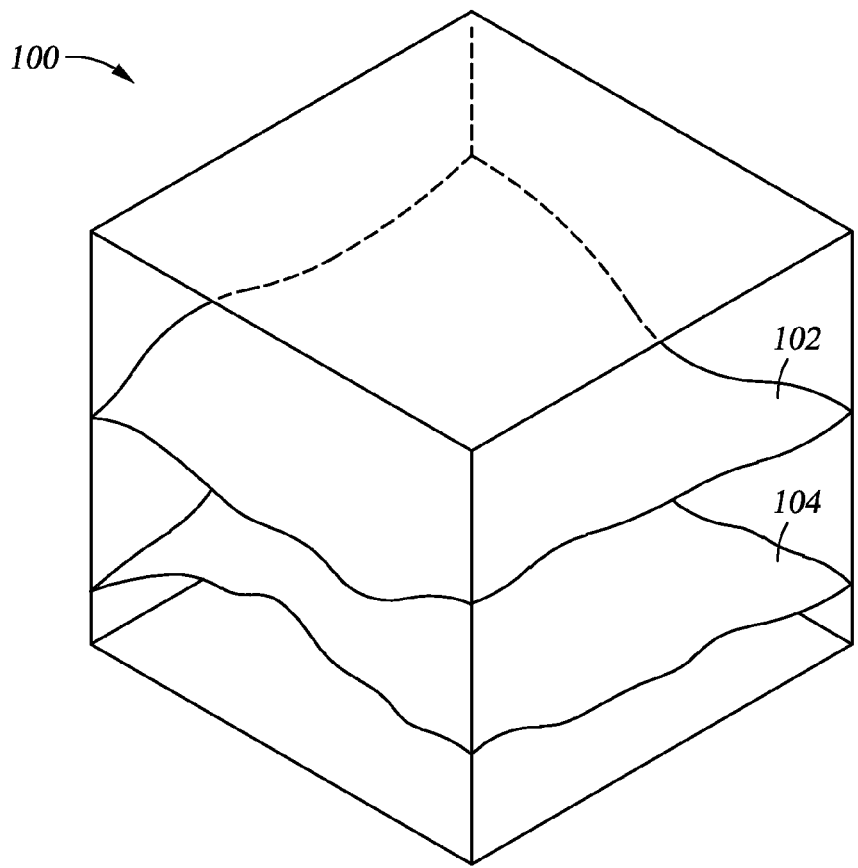
FIG. 1 shows a perspective view of a seismic data volume.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the terms "couple" or "couples" are intended to mean either an indirect or direct connection. Thus, if a first device couples to a second device, that connection may be through a direct connection or through an indirect connection via other devices and connections.

"Patch" shall mean a subsurface feature identified within a seismic data volume prior to a determination as to whether the subsurface feature corresponds to an actual horizon of interest. "Patches" shall be the plural of "patch."

"Horizon tracking algorithm" shall mean any program or software that identifies subsurface features within a seismic data volume, whether or not the subsurface features identified correspond to actual physical horizons within a hydrocarbon bearing formation represented by the seismic data volume.

"Display device" shall include not only a single display device, but also multiple display devices used in conjunction.

"Seismic data volume" shall mean any attribute volume which is used to identify a subsurface horizon (e.g., velocity volume, porosity volume, coherency volume, phase volume, frequency volume).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to communicate that the scope of the disclosure, including the claims, is limited to that embodiment.

The various embodiments are directed to a method and system of identifying horizons of interest in seismic data volumes. More particularly, the various embodiments may involve applying the seismic data volume to a horizon tracking algorithm which analyzes the seismic data volume and identifies regions that may represent horizons in the seismic data volume. In order to differentiate established horizons in a seismic data volume from regions that may represent horizons of interest but have yet to be confirmed, the specification and claims refers to regions identified by the horizon tracking algorithm as patches, with the patches stored in a "patch volume." After application of the seismic data volume to the horizon tracking program (and creation of the patch volume), the original seismic data volume and the patch volume may then be analyzed together. The process of assigning horizons of interest in the seismic data volume may thus involve analyzing each patch in relation to the seismic data volume, and where a patch indeed represents a horizon, the horizon is assigned. The specification first turns to a description of seismic data volumes to orient reader to concepts related to storage of seismic data.

Example Organization of Seismic Data Volumes

FIG. 1 shows a perspective view of a representation of a three-dimensional seismic data volume 100 of a hydrocarbon bearing formation. In example situations, seismic data volume 100 may have been created by way of a seismic survey. That is, a seismic survey (e.g., land-based survey, marine survey) may have been conducted to provide seismic mapping of the subsurface structures associated with a hydrocarbon formation, resulting in seismic data volume 100. Though the seismic data volume 100 is shown as a three-dimensional cube, the shape may be any suitable shape, in many cases corresponding to the physical shape of the hydrocarbon bearing formation. In FIG. 1, two example subsurface features 102 and 104 are shown, however the number of subsurface features is not limited to two, and any number of subsurface features may be possible within a seismic data volume. While FIG. 1 shows the example seismic data volume 100 as a continuous structure, the underlying data may be logically organized as a linear array of contiguous memory locations. The specification thus turns to linear arrays.

Figure 2:
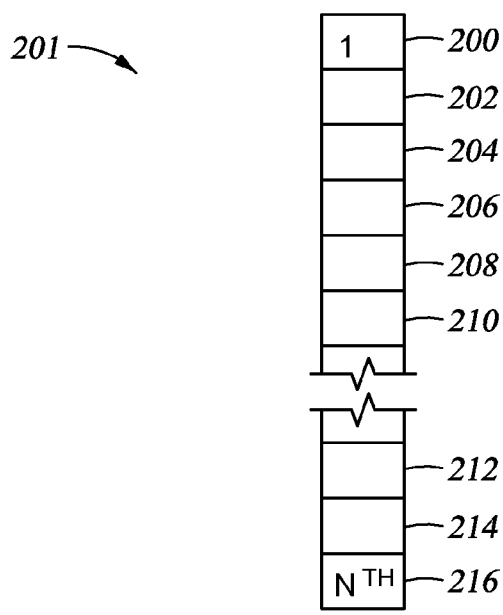
FIG. 2 shows a block diagram of a linear array.

FIG. 2 shows a block diagram of a linear array 201. In particular, each block 200 through 216 may be a memory address in a linear sequence of memory addresses, with block 200 having a first memory address in the linear array (e.g., memory address "0") and block 216 having the last memory address in the linear array (e.g., the "nth" memory address). Although only ten blocks (and thus ten memory addresses or locations) are shown in FIG. 2, any number of memory addresses is possible. Associated with each memory address in the linear array is one piece of information (e.g., one byte). In the case of organizing data of a seismic data volume 100 as a linear array, the linear array may span on the order of 200 billion memory addresses, with each memory address storing data that represents a parameter associated with the seismic survey (e.g., reflectivity of seismic signals attributable to a particular location). If each memory location is associated with a byte of data, the linear array may span 200 Giga-bytes in size.

Figure 3:
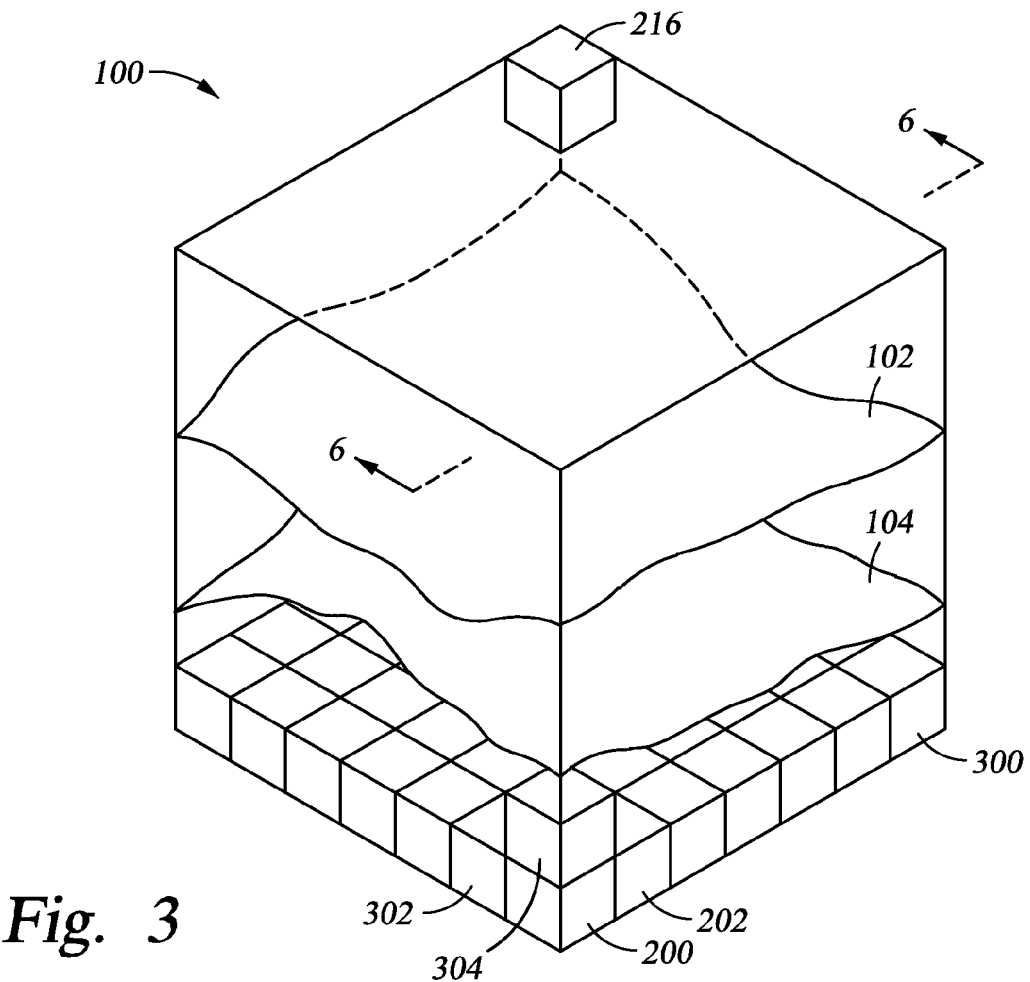
FIG. 3 shows a perspective view of a seismic data volume to show an example logical arrangement of memory addresses in accordance with at least some embodiments.

FIG. 3 shows a perspective view of the seismic data volume 100 partially divided into memory locations to show one example relationship between the three-dimensional representation of the seismic data volume 100 and storage as a linear array. Each memory location can thus be thought of as representing a small physical volume within the overall seismic data volume 100, and the data within the memory location representing physical parameter of the formation within the small volume. However, in FIG. 3 only a few representations of the memory locations of the linear array have been illustrated so as not to unduly complicate the figure. In one example system the sequence of memory locations of the linear array may be arranged in horizontal layers. In the horizontal layer example arrangement, the first memory location 200 (i.e., logically the first small physical volume) of the linear array may be assigned to a physical location at the bottom closest corner in the view of FIG. 3. The next memory location 202 of the linear array logically abuts memory location 200 from an address perspective, and may be assigned to an abutting small physical volume. The assignment of abutting memory locations in the linear array to abutting small physical volumes in this example continues along horizontally until the end of a row is reached, at the right corner 300. In some cases, the next memory location 302 in the linear array is assigned to a small physical volume in this example abutting the small physical volume associated with memory location 200. The assignment continues along the horizontal row, and ultimately along all the small physical volumes in the level. The next memory location 304 in the linear array is assigned to a small physical volume sitting directly on top of the small physical volume associated with memory location 200, and so on, ending with the small physical volume at the far back corner, in this example associated with memory location 216.

The example system of FIG. 3 is simplified for purposes of explanation. In practice, each horizontal layer may comprise many thousands or hundreds of thousands of small physical volumes, and thus many thousands or hundreds of thousands of memory locations. Further, some basin-scale seismic data volumes (e.g., Gulf of Mexico) may span 200 Giga-bytes or more. Moreover, other organizational relationships of the small physical volumes (and thus the memory locations) are possible, such as vertical layers or layers of time-based seismic trace values. The specification now turns to organization of horizon information.

Example Organization of Horizon Information

Figure 4:
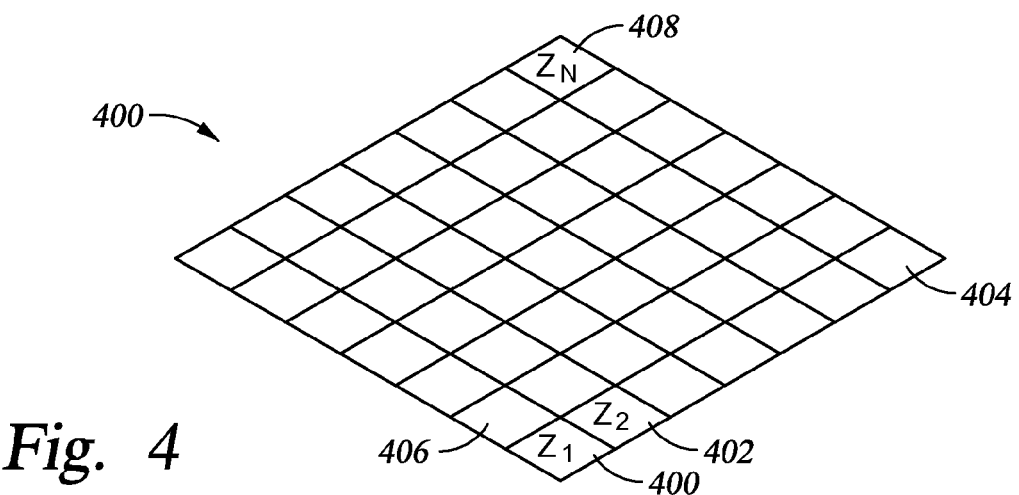
FIG. 4 shows a perspective view of an example logical arrangement of memory addresses of a horizon file in accordance with at least some embodiments.

In the example systems, once a feature in the seismic data volume (e.g., subsurface feature 102, or subsurface feature 104) is identified as a subsurface horizon of interest, horizon information is separately stored, such as in memory in a data structure, within database, or as a separate file. In the example situation of storing as a separate file (i.e., a horizon file), many organizational structures for the horizon file are possible, and FIG. 4 shows a perspective view of one example logical organization of a horizon file. In particular, FIG. 4 shows a perspective view of horizon file 400 divided into memory locations to show one example system of storing horizon information as a linear array. Each memory location can be thought of as representing a small physical area. In the example arrangement, the first memory location 400 (i.e., logically the first small physical area) of the linear array may be assigned to a physical area at the closest corner in the view of FIG. 4. The next memory location 402 logically abuts memory location 400 from an address perspective, and may be assigned to an abutting small physical area. The assignment of abutting memory locations in the linear array to abutting small physical areas continues along horizontally in the example system until the end of a row is reached, at the right corner 404. In some cases, the next memory location 406 in the linear array is assigned to small physical area, in this example on the left (abutting the small physical area associated with memory location 400), and the assignment continues along the horizontal row. Ultimately, all the small physical areas are associated with memory locations in the horizon file 400, ending with the small physical area at the far back corner, in this example associated with memory location 408.

The horizons of interest are, in many cases, planar surfaces within the seismic data volume (and, likewise, in the hydrocarbon bearing formation), and the features of interest of a horizon are the horizontal expanse and the depth at each location of the horizontal expanse. Thus, each memory location in FIG. 4 can be thought of as corresponding to a horizontal location, and the value stored within a memory location being a depth of the horizon at the corresponding horizontal location. In the example system of FIG. 4, memory location 400 stores a value "$Z_1$" corresponding to a depth of the horizon at the horizontal location associated with memory location 400, memory location 402 stores a value "$Z_2$" corresponding to a depth of the horizon at the horizontal location associated with memory location 402, and so on, ending with memory location 408 stores a value "$Z_N$" corresponding to a depth of the horizon at the horizontal location associated with memory location 408.

Creation of a Patch Volume

In accordance with example systems, a seismic data volume is applied to a horizon tracking algorithm to identify patches. Any of a variety of commercially available horizon tracking algorithms (which may also be referred to as dip estimation programs) may be used, and likewise any after-developed horizon tracking algorithms may be used. In some cases, the horizon tracking algorithms operate autonomously, identifying patches without user input as to where any particular patch may reside. In other cases, the user may "seed" the horizon tracking algorithm by identifying locations where patches may reside, or by setting ranges of the values of the seismic data volume that, when found, may correspond to the patches. Regardless of the precise operation and/or vintage of the horizon tracking algorithm, there may be many subsurface features that a horizon tracking algorithm identifies, but not all the subsurface features identified are horizons of interest (e.g., not all the subsurface features are horizons defining the top or bottom of a layer of trapped hydrocarbons).

The patches identified by the horizon tracking algorithm are stored as a patch volume. In some example systems, and in order to speed the process of correlating patches identified by the horizon tracking algorithm to horizons of interest in the seismic data volume, the patch volume is a file organized similarly to the seismic data volume. That is, in example systems the patch volume is a linear array of memory locations, with each memory location corresponding to a small physical volume of the hydrocarbon bearing formation.

Figure 5:
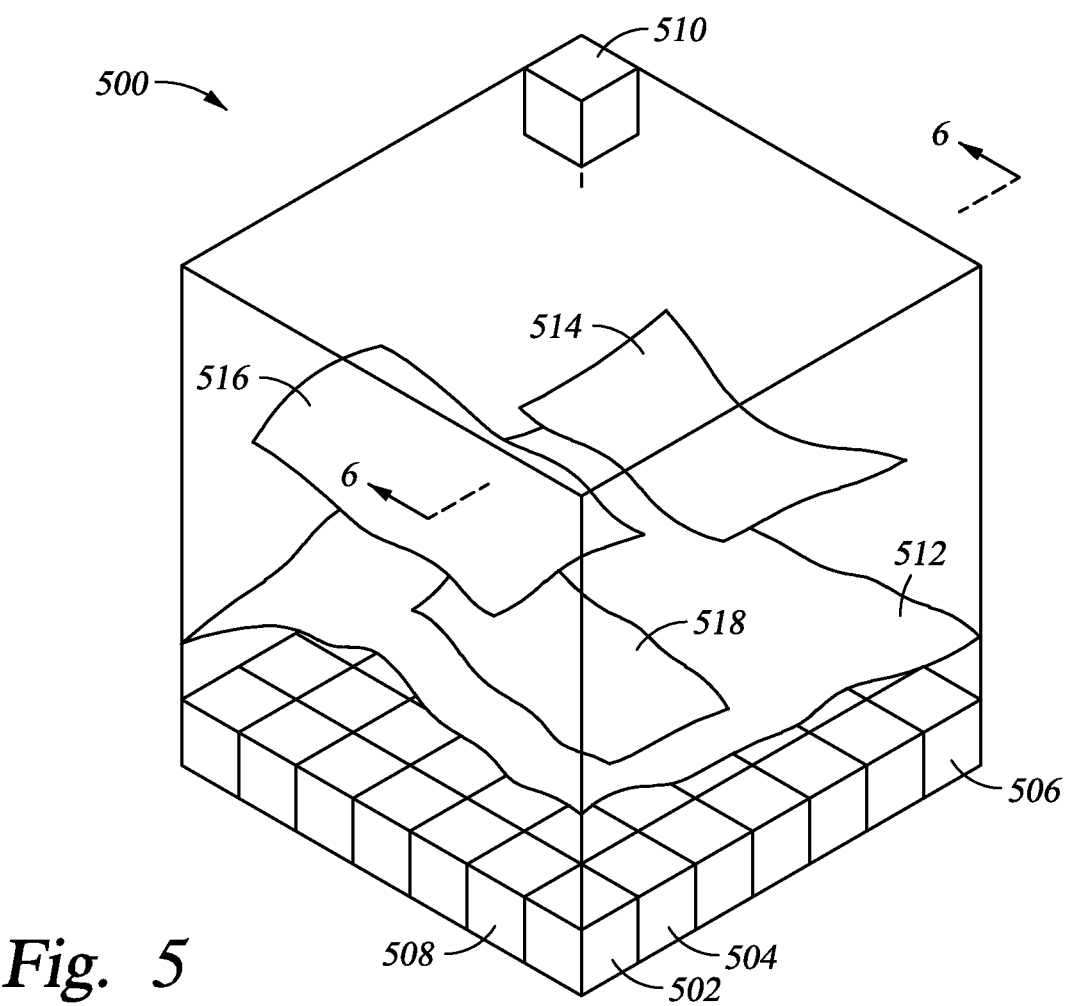
FIG. 5 shows a perspective view of a patch volume in accordance with at least some embodiments.

FIG. 5 shows a perspective view of a patch volume 500 partially divided into memory locations to show one example storage system for the patch volume. In particular, the patch volume may be logically arranged as a linear array. Each memory location in the linear array of the patch volume can be thought of as representing a small physical volume, with the data within each memory location representing an identity of a patch (if any) at the location. In FIG. 5 only a few representations of the memory locations of the patch volume have been illustrated so as not to unduly complicate the figure. In one example system the sequence of memory locations of the patch volume may be logically arranged in horizontal layers. In the horizontal layer example arrangement, the first memory location 502 (i.e., logically the first small physical volume) of the patch volume may be assigned to a physical location at the bottom closest corner in the view of FIG. 5. The next memory location 504 of the linear array abuts memory location 502 from an address perspective, and may be assigned to an abutting small physical volume. The assignment of abutting memory locations to abutting small physical volumes in this example continues along horizontally until the end of a row is reached, at the right corner 506. In some cases, the next memory location 508 in the linear array is assigned to small physical volume abutting the small physical volume associated with memory location 502. The assignment continues along the horizontal row, and ultimately along all the small physical volumes in the level. The next memory location in the patch volume is assigned to a small physical volume sitting directly on top of the small physical volume associated with memory location 502, and so on, ending with the small physical volume at the far back corner, in this example associated with memory location 510.

Much like the example system of FIG. 3, the example patch volume 500 of FIG. 5 is simplified for purposes of explanation. In practice, each horizontal layer may comprise many thousands or hundreds of thousands of memory locations. Further, for an example basin-scale seismic data volume spanning 200 billion memory locations or more, a corresponding patch volume may likewise span 200 billion memory locations or more. Moreover, other organizational relationships of the patch volumes (and thus the memory locations) are possible, such as vertical layers. Regardless of the precise organization structure and/or content, in accordance with an example system the patch volume is organized as an array of memory locations, each memory location corresponding to a small physical volume (e.g., corresponding to small physical volumes of the seismic data volume). In some example systems, the patch volume spans one-to-one the volume spanned by the seismic data volume.

FIG. 5 also illustrates that patches identified need not span the entire volume. Consider, for example, that within a hydrocarbon bearing formation several fault structures may exist, with corresponding layers on opposite sides of the fault residing at different vertical depths because of differential compaction, or perhaps differing rates of uplifting on opposite sides of the fault. Nevertheless, a first patch may be identified by the horizon tracking program, but the patch may stop or be bounded by one or more fault structures. Thus, a patch may only span a small portion of the overall volume. In FIG. 5, patch 512 is shown to illustrate a patch that spans the entire patch volume 500, while patch 514 spans a smaller portion of the patch volume (i.e., does not span the entire volume). Likewise, patch 516 spans a smaller portion of the patch volume, as does patch 518. It may very well be that a horizon tracking program identifies corresponding layers on opposite sides of a fault as respective patches, but the horizon tracking program may not be able to determine that the respective patches correspond to each other, and thus the patches will be separately identified. To the extent separately identified patches on opposite sides of a fault are part of a horizon of interest, a geologist analyzing the data may make the final determination. An example system for making such an analysis is discussed more below.

Many patches may be identified and stored in the patch volume. At locations where a patch resides, a value may be stored identifying the patch (in the example systems the horizontal location and depth are identified by the "location" of small physical volume within the patch volume); however, where no patch is located a null value may be stored in the memory location. Thus, though a basin-scale seismic data volume, such as seismic data volume 100, may span 200 Giga-bytes or more, the corresponding patch volume, while logically representing the same hydrocarbon bearing formation, may nonetheless have a smaller overall memory storage size. The specification now turns to an example method and system of correlating patches to horizons of interest.

Correlating Patches to Horizons of Interest

Figure 6:
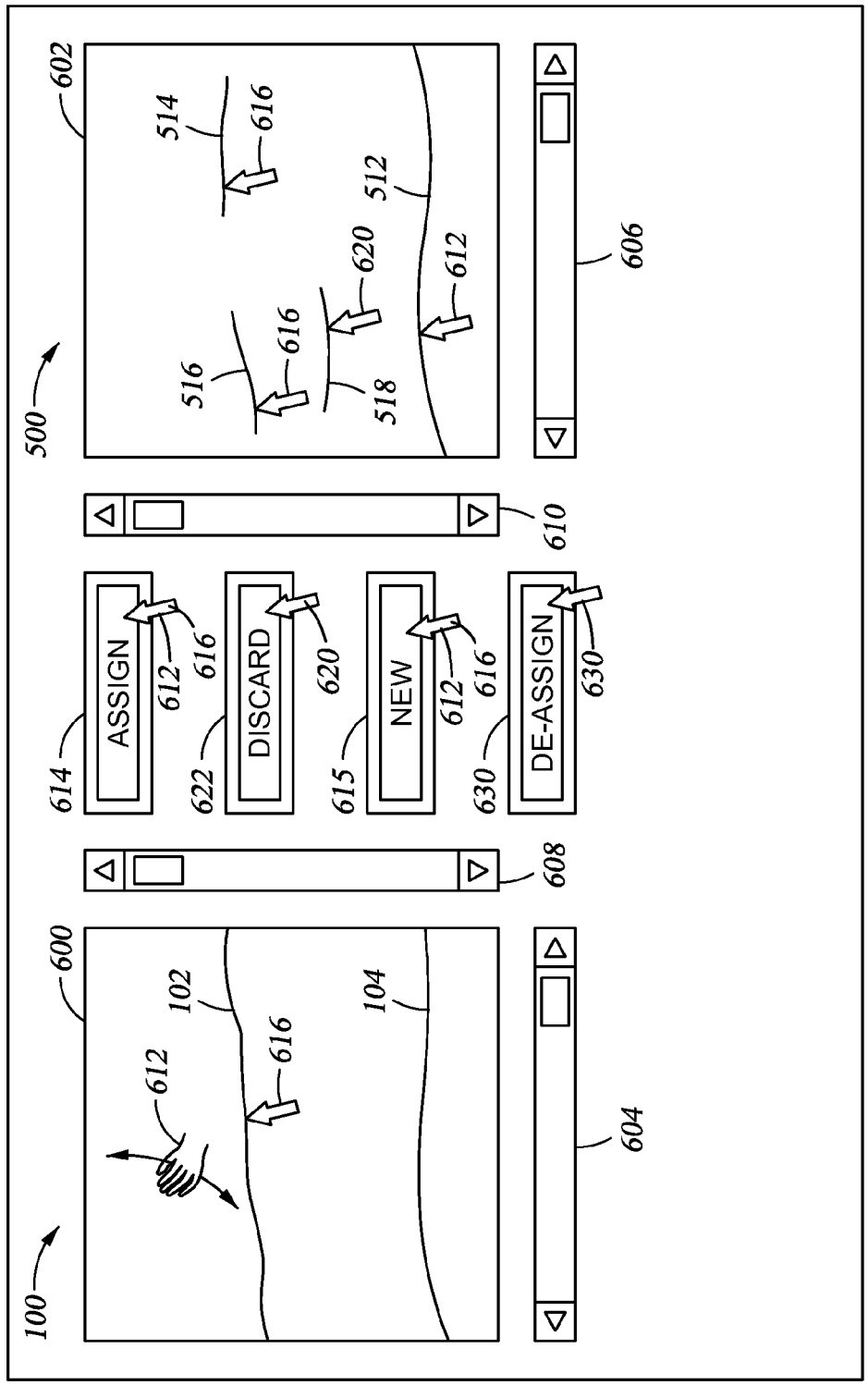
FIG. 6 shows a user interface in accordance with at least some embodiments.

In accordance with example systems, correlating patches from the patch volume to horizons of interest may take place by a system and/or method where the seismic data volume 100 (or portions thereof), and the patch volume 500 (or portions thereof) are simultaneously displayed on one or more display devices. In some example systems, the view "into" the seismic data volume 100 and the view "into" the patch volume 400 are from same vantage point. The system enables a user (e.g., geologist, reservoir engineer) to correlate the patches to the subsurface features to create subsurface horizons of interest, FIG. 6 shows an example user interface displaying a portion of the seismic data volume 100 and a portion of the patch volume 500 for purposes of the correlation. In particular, the left portion of the FIG. 6 shows an elevation view 600 of the seismic data volume 100 taken along a vertical "slice" through the seismic data volume 100 (e.g., along line 6-6 of FIG. 3). Visible in the elevation view 600 are the subsurface features 102 and 104. Again, the seismic data volume may comprise hundreds of features or more, and the elevation view 600 shows only two so as not to unduly complicate the figure and/or the discussion.

The right portion of FIG. 6 shows an elevation view 602 of the patch volume 500 taken along a corresponding vertical "slice" through the patch volume 500 (e.g., along line 6-6 of FIG. 5). Visible in the elevation view 500 are the example patches 512, 514, 516 and 518. Again, many patches may be identified from the seismic data volume, in some cases hundreds of patches or more, and the elevation view 602 shows a small subset so as not to unduly complicate the figure and/or the discussion.

Correlating patches to subsurface features to create horizons may thus involve analysis by the user of the seismic data volume 100 and the patch volume 500. More particularly, the user may interact with the views the seismic data volume 100 and patch volume 500 as a method to identify horizons of interest. For example, the view of the seismic data volume 100 may be moved further into the volume (such as by interaction with a slider bar 604 associated with view 600, or slider bar 606 associated with view 602). As another example of interaction, the zoom of view the may be increased or decreased (such as by interaction with a slider bar 608 associated with view 600, or slider bar 610 associated with view 602). In yet still further example interactions, the angle or vantage point of view may be changed by a grab and move operation (such as by illustrative grabbing feature 612 (e.g., a hand shaped feature) within the view 600).

In one example system, the view 600 and view 602 are tied together in the sense that changes to one view makes corresponding changes to the other. For example, if a user changes the view 600 by "moving" further into the volume, the view 602 changes correspondingly with respect to view 602 of the patch volume 500, and vice versa. In some cases, the changes in view and/or location are animated such that, to the eye of an observer, the changes in view and/or location flow smoothly or at an "interactive frame rate" (e.g., at a frame rate of 10 frames per second or faster).

Once a user has determined that a patch corresponds to a subsurface feature of interest, the example systems enable the user to assign the patch to create a horizon or portion of a horizon. Consider, for purposes of explanation, that the user determines that patch 512 (corresponding to subsurface feature 104) corresponds to a horizon of interest, and that the horizon has not been previously identified. Thus, in one example work flow, the user may select patch 512 by "clicking" on the patch 512 by way of pointing feature 612, and pressing the "assign" button 614 with the pointing feature 612. Because the patch 512 is to be assigned to a new horizon, the user may then press the "new" button 615 by clicking on the button 615 with the pointing feature 612. Pressing the "new" button 615 may thus trigger a mechanism to identify, name, and/or number the new horizon, such as a text box or a pop-up window. Thereafter, the area within the seismic data volume 100 corresponding to the patch 512 may be shown and/or highlighted in the view 600. Other example methods to assign the patch 512 to create a horizon may be equivalently used.

In practice, the one-to-one correspondence of the patch 512 to an entire subsurface feature 104 may occur infrequently. More often, because horizon tracking programs represent an imperfect science in the first instance, and because horizon tracking programs have difficult tracking patches across discontinuities (e.g., faults, or areas where—in the far distance past—erosion occurred), a patch may only partially correspond to a horizon of interest. In some cases, multiple patches may correspond to a single horizon of interest. For example, patch 514 may correspond to subsurface feature 102 in the areas associated with patch 514, while patch 516 likewise may correspond to the subsurface feature 102 in the areas associated with patch 516.

Consider, for purposes of explanation, that the user determines that patch 514 (corresponding to subsurface feature 102) is part of a horizon of interest, and that the horizon has not been previously identified. Thus, in one example work flow, the user may select patch 514 by "clicking" on the patch 514 by way of pointing feature 616, and pressing the "assign" button 614 with the pointing feature 616. Because the patch 514 is to be assigned to a new horizon in this example, the user may then press the "new" button 615 by clicking on the button 615 with the pointing feature 616. Pressing the "new" button 615 may thus trigger a mechanism to identify, name, and/or number the new horizon. Thereafter, the area within the seismic data volume 100 corresponding to the patch 514 may be shown and/or highlighted in the view 600. Next, in assigning patch 516 to subsurface feature 102 as a horizon, the user may select patch 516 by "clicking" on the patch 516 by way of pointing feature 616, pressing the "assign" button 614 with the pointing feature 616, and since the horizon has already been created, the patch may be assigned to the horizon by clicking on the horizon within the view 600 with pointing feature 616 (i.e., clicking on portion of the subsurface feature 102 highlight by virtue of the previous assignment of patch 514). In this example work flow, multiple patches are assigned to a single horizon. Other example methods to assign a patch to a previously created horizon may be equivalently used.

In some cases, once a patch from the patch volume has been assigned to a subsurface feature in the seismic data volume to create and/or expand a horizon, the patch is removed from the patch volume. That is, in example systems where assignment results in removal of a patch from the patch volume, the values within memory locations of the patch volume that identified the patch may be replaced with null values such that that patch no longer resides within the patch volume, and thus the patch is no longer displayed in the window 602.

Further still, the example system may enable the user to discard patches that do not correspond to horizons of interest. Note that there may be two categories of patches associated with discarding: 1) a patch fails to correspond to a subsurface feature at all; and 2) a patch corresponds to a subsurface feature, but the user determines the subsurface feature is not a horizon of interest (e.g., does not form an upper or lower boundary of a location where hydrocarbons are trapped). Consider, as an example of a patch to be discarded, patch 518. If the geologist or reservoir engineer decides that patch 518 fails to correspond to a subsurface feature of interest, the patch 518 may be removed from the patch volume. In an example work flow, discarding patch 518 may include the user selecting patch 518 by "clicking" on the patch 518 by way of pointing feature 620, and pressing the "discard" button 622 with the pointing feature 620. In this case, the values within memory locations within the patch volume that identified the patch 518 may be replaced with null values such that that patch 518 no longer resides within the patch volume, and thus is no longer displayed.

A geologist or reservoir engineer may thus work through all the patches in the patch volume, either assigning the patch to a horizon, or discarding the patch, until all the patches have been addressed (and thus all the horizons have been identified). The inventors of the current specification have found that analyzing a seismic data volume for horizons in this way is faster than related art techniques.

When a new horizon is identified (e.g., a user presses the "new" button 615), a horizon file is created for the horizon. For example, a horizon file similar to the structure of FIG. 4 may be created for each individual horizon of interest identified in the seismic data volume. In some example systems, the horizon file may be created with a horizontal extent that matches the horizontal extent of the formation. At memory locations within the horizon file that correspond to the horizontal locations of the initial patch the depth values in the horizon file correspond to the depth of the patch, and a predetermined value or values (e.g., null values) indicating the lack of horizon may fill the balance of the horizon file. Additional patches assigned to the horizon result in additional depth values at the horizontal locations corresponding to the additional patches. Further features may include an ability to "fill in" the regions of a horizon file between the patches assigned to the horizon. In the example situation of FIG. 6, if two horizons are created (corresponding to subsurface features 102 and 104), two horizon files are created—one horizon file containing information associated with the horizon attributable to patch 612, and one horizon file containing information associated with the horizon attributable to patches 514 and 516.

Still referring to FIG. 6, in some example systems the assignment of a patch to a subsurface feature to create a horizon is a reversible maneuver. That is, a geologist or reservoir engineer may make an initial determination and assign a patch to a horizon, and then later want to reverse the assignment. Even in cases where a patch is removed from the patch volume, an assignment is reversible inasmuch as the data within the patch volume can be recreated from the horizon file created responsive to the initial assignment. Thus, in an example workflow, de-assigning a patch may include the user selecting a horizon in the view 600 such as by "clicking" on the horizon and then pressing the "de-assign" button 630. The underlying program may then recreate the patch or patches into the patch volume, with the recreation based on the data in the horizon file for the horizon selected.

Figure 7:
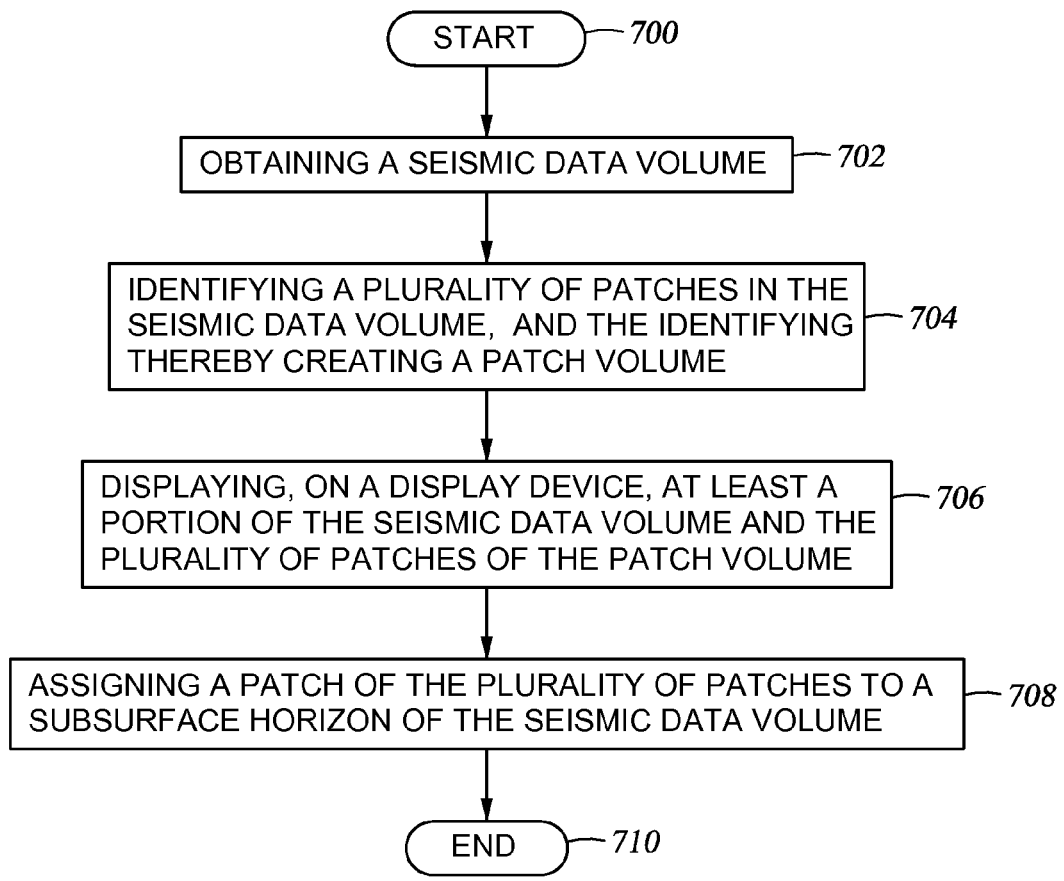
FIG. 7 shows a method in accordance with at least some embodiments.

FIG. 7 shows a method (some of which may be executed by software) in accordance with an example system. In particular, the method starts (block 700) and includes: obtaining a seismic data volume (block 700); identifying a plurality of patches in the seismic data volume, and the identifying thereby creating a patch volume (block 702); displaying, on a display device, at least a portion of the seismic data volume and the plurality of patches of the patch volume (block 704); and assigning a patch of the plurality of patches to a subsurface horizons of the seismic data volume (block 706). Thereafter, the method ends (block 708), likely to be immediately restated regarding a new patch.

Figure 8:
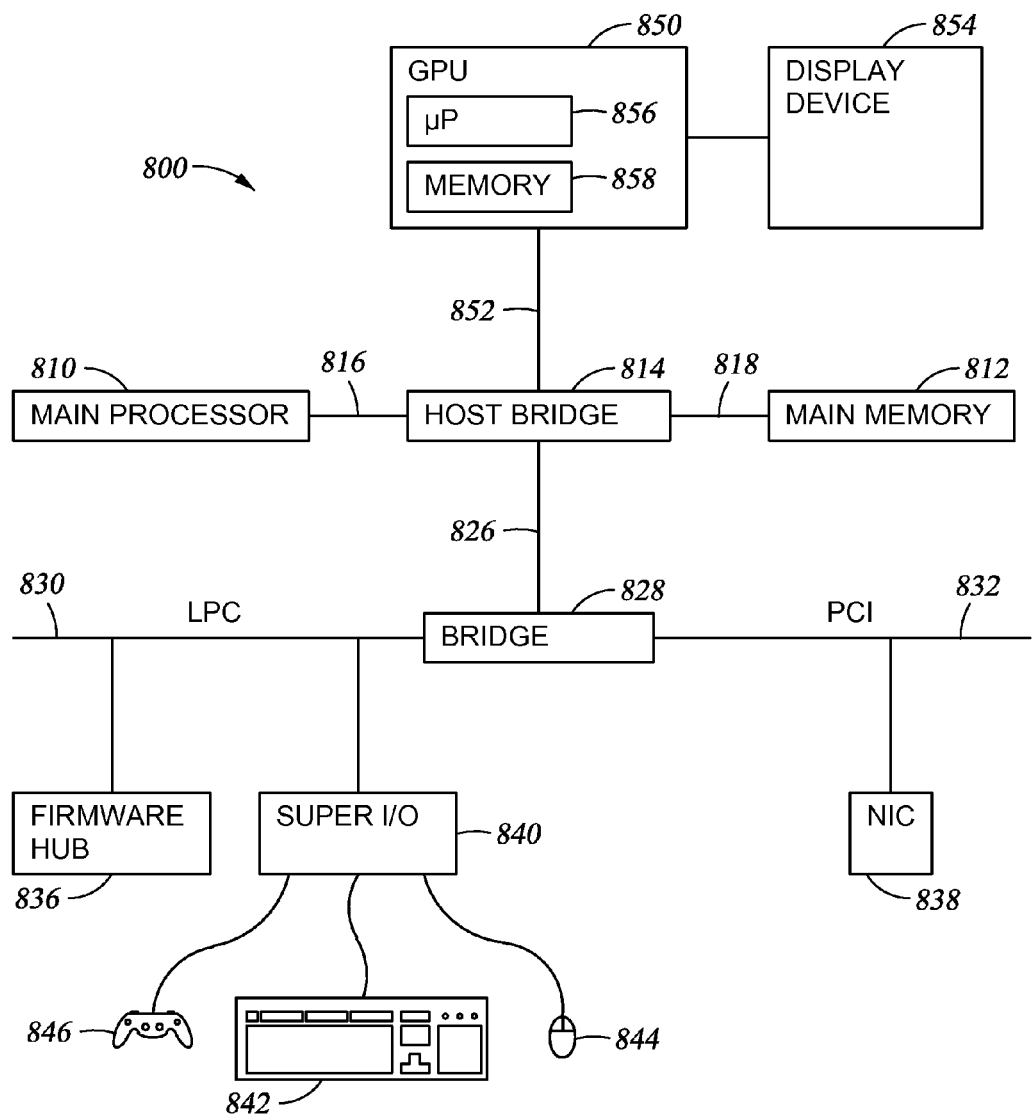
FIG. 8 shows a computer system in accordance with at least some embodiments.

FIG. 8 illustrates a computer system 800 in accordance with at least some embodiments. In particular, computer system 800 comprises a main processor 810 coupled to a main memory array 812, and various other peripheral computer system components, through integrated host bridge 814. The main processor 810 may be a single processor core device, or a processor implementing multiple processor cores. Furthermore, computer system 800 may implement multiple main processors 810. The main processor 810 couples to the host bridge 814 by way of a host bus 816, or the host bridge 814 may be integrated into the main processor 810. Thus, the computer system 800 may implement other bus configurations or bus-bridges in addition to, or in place of, those shown in FIG. 8.

The main memory 812 couples to the host bridge 814 through a memory bus 818. Thus, the host bridge 814 comprises a memory control unit that controls transactions to the main memory 812 by asserting control signals for memory accesses. In other embodiments, the main processor 810 directly implements a memory control unit, and the main memory 812 may couple directly to the main processor 810. The main memory 812 functions as the working memory for the main processor 810 and comprises a memory device or array of memory devices in which programs, instructions and data are stored. The main memory 812 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 812 is an example of a non-transitory computer-readable medium storing programs and instructions, and other non-limited examples are disk drives and flash memory devices.

The illustrative computer system 800 also comprises a second bridge 828 that bridges the primary expansion bus 826 to various secondary expansion buses, such as a low pin count (LPC) bus 830 and peripheral components interconnect (PCI) bus 832. Various other secondary expansion buses may be supported by the bridge device 828.

Firmware hub 836 couples to the bridge device 828 by way of the LPC bus 830. The firmware hub 836 comprises read-only memory (ROM) which contains software programs executable by the main processor 810. The software programs comprise programs executed during and just after power on self test (POST) procedures as well as memory reference code. The POST procedures and memory reference code perform various functions within the computer system before control of the computer system is turned over to the operating system. The computer system 800 further comprises a network interface card (NIC) 838 illustratively coupled to the PCI bus 832. The NIC 838 acts to couple the computer system 800 to a communication network, such the Internet, or local- or wide-area networks.

Still referring to FIG. 8, computer system 800 may further comprise a super input/output (I/O) controller 840 coupled to the bridge 828 by way of the LPC bus 830. The Super I/O controller 840 controls many computer system functions, for example interfacing with various input and output devices such as a keyboard 842, a pointing device 844 (e.g., mouse), a pointing device in the form of a game controller 846, various serial ports, floppy drives and disk drives. The super I/O controller 840 is often referred to as "super" because of the many I/O functions it performs.

The computer system 800 may further comprise a graphics processing unit (GPU) 850 coupled to the host bridge 814 by way of bus 852, such as a PCI Express (PCI-E) bus or Advanced Graphics Processing (AGP) bus. Other bus systems, including after-developed bus systems, may be equivalently used. Moreover, the graphics processing unit 850 may alternatively couple to the primary expansion bus 826, or one of the secondary expansion buses (e.g., PCI bus 832). The graphics processing unit 850 couples to a display device 854 which may comprise any suitable electronic display device upon which any image or text can be plotted and/or displayed. The graphics processing unit 850 may comprise an onboard processor 856, as well as onboard memory 858. The processor 856 may thus perform graphics processing, as commanded by the main processor 810. Moreover, the memory 858 may be significant, on the order of several hundred megabytes or more. Thus, once commanded by the main processor 810, the graphics processing unit 850 may perform significant calculations regarding graphics to be displayed on the display device, and ultimately display such graphics, without further input or assistance of the main processor 810.

Thus, it is upon illustrative computer system 800 that the operations related to identifying patches and assignment of patches to be horizons discussed above may be performed. Moreover, the various operations related to identifying patches and assignment of patches to be horizons may be performed by a host of computer systems, such as computer system 800, operated in a parallel fashion.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

It is noted that while theoretically possible to perform some or all the calculations and analysis by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

References to "one embodiment", "an embodiment", and "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace any and all such variations and modifications.

We claim:

1. A method comprising:
    obtaining, by a computer system, a seismic data volume;
    identifying, by the computer system, a plurality of patches in the seismic data volume, and the identifying thereby creating a patch volume, the patch volume distinct from the seismic data volume; and then
    displaying, on a display device, at least a portion of the seismic data volume, and simultaneously displaying on a display device the plurality of patches of the patch volume;
    assigning a patch of the plurality of patches to a subsurface horizon of the seismic data volume by selecting from a display device a first patch of the patch volume and designating the first patch to be a portion of a first subsurface horizon; and
    discarding a patch from the patch volume by selecting from a display device a second patch of the patch volume, identifying the second patch as not belonging to a subsurface horizon, and removing the second patch from the patch volume.

2. The method of claim 1 wherein identifying the plurality of patches further comprises:
    applying the seismic data volume to a horizon tracking algorithm; and
    creating the patch volume based on patches identified by the horizon tracking algorithm.

3. The method of claim 2 wherein creating the patch volume further comprises creating the patch volume organized as an array of memory locations, each memory location corresponding to a physical volume upon which the seismic data volume is based.

4. The method of claim 2 wherein creating the patch volume further comprises creating the patch volume organized as an array of memory locations, each memory location corresponding to a physical volume upon which the seismic data volume is based, and each memory location stores an indication of the presence or absence of a portion of a patch at the corresponding physical volume.

5. The method of claim 4 wherein the correspondence between the physical volumes considered together corresponds one-to-one with the volume spanned by the seismic data volume.

6. The method of claim 1 further comprising, prior to the identifying, setting a range of values that, when found within the seismic data volume, represent a subsurface horizon in the seismic data volume.

7. The method of claim 1 wherein assigning further comprises creating a horizons file comprising a plurality of indications of location of a horizon, and where the locations do not represent physical volumes of the hydrocarbon bearing formation upon which the seismic data volume is based.

8. A system comprising:
    a processor;
    a memory coupled to the processor;
    a display device coupled to the processor; and
    a user interface device coupled to the processor;
    wherein the memory storing a program that, when executed by the processor, causes the processor to:
        read a seismic data volume from a storage location;
        identify a plurality of patches in the seismic data volume;
        create a patch volume based on the plurality of patches, the patch volume distinct from the seismic data volume;
        display on the display device at least a portion of the seismic data volume, and simultaneously display on the display device the plurality of patches of the patch volume; and
        receive a first indication from the user interface of selection of a first patch of the patch volume, and identify a first patch based on location of a pointing feature displayed on a display device when the first indication is received;
        receive a second indication from the user interface of selection of a first subsurface horizon of the seismic data volume, and identify the first subsurface horizon based on location of a pointing feature displayed on a display device when the second indication is received; and then
        assign the first patch to be a portion of the first subsurface horizon.

9. The system of claim 8 wherein when the program identifies, the program causes the processor to:
    perform a horizon tracking algorithm; and
    create the patch volume based on patches identified by the horizon tracking algorithm.

10. The system of claim 9 wherein when the processor creates the patch volume, the program causes the processor to create the patch volume organized as an array of memory locations, each memory location corresponding to a physical volume upon which the seismic data volume is based.

11. The system of claim 9 wherein when the processor creates the patch volume, the program causes the processor to create the patch volume organized as an array of memory locations, each memory location corresponding to a physical volume upon which the seismic data volume is based, and the memory locations considered together correspond to a volume spanned by the seismic data volume.

12. The system of claim 9 wherein when the processor receives indications, the program causes the processor to:
   receive an indication of selection of a first patch of the patch volume; and then
   assign the first patch to be a portion of a first subsurface horizon.

13. The system of claim 12 wherein when the processor receives indications, the program causes the processor to:
   receive an indication of selection of a second patch of the patch volume; and then
   assign the second patch as not belonging to a subsurface horizon; and
   remove the second patch from the patch volume.

14. The system of claim 9 wherein when responsive to the processor's receipt of indications, the program further causes the processor to create a horizons file comprising a plurality of indications of location of a horizon, and where the locations do not represent physical volumes of the hydrocarbon bearing formation upon which the seismic data volume is based.

15. A non-transitory computer-readable medium storing a program that, when executed by a processor, causes the processor to:
   read a seismic data volume from a storage location;
   identify a plurality of patches in the seismic data volume;
   create a patch volume based on the plurality of patches, the patch volume distinct from the seismic data volume;
   display on a display device at least a portion of the seismic data volume, and simultaneously display the plurality of patches of the patch volume on a display device;
   receive an indication from a user interface of selection of a first patch of the patch volume;
   assign the first patch to be a portion of a first subsurface horizon;
   receive an indication from the user interface of selection of a second patch of the patch volume;
   receive an indication from the user interface that the second patch does not belong to a subsurface horizon; and
   responsive to the indication that the second patch does not belong
   remove the second patch from the patch volume.

16. The non-transitory computer-readable medium of claim 15 wherein when the program identifies, the program causes the processor to:
   perform a horizon tracking algorithm; and
   create the patch volume based on patches identified by the horizon tracking algorithm.

17. The non-transitory computer-readable medium of claim 16 wherein when the processor creates the patch volume, the program causes the processor to create the patch volume organized as an array of memory locations, each memory location corresponding to a physical volume of a hydrocarbon formation upon which the seismic data volume is based.

18. The non-transitory computer-readable medium of claim 16 wherein when the processor creates the patch volume, the program causes the processor to create the patch volume organized as an array of memory locations, each memory location corresponding to a physical volume of the hydrocarbon formation upon which the seismic data volume is based, and the memory locations considered together correspond to a volume spanned by the seismic data volume.

19. The non-transitory computer-readable medium of claim 15 wherein when the processor assigns, the program further causes the processor to create a horizons file comprising a plurality of indications of location of a horizon, and where the locations do not represent physical volumes upon which the seismic data volume is based.

20. The method of claim 1:
   wherein selecting the first patch further comprises choosing the first patch using a pointing feature displayed on the display device; and
   wherein designating the first patch to be a portion of the first subsurface horizon further comprises choosing the first subsurface horizon using a pointing feature displayed on the display device.

21. The non-transitory computer-readable medium of claim 15:
   wherein when the processor receives the indication of selection of the first patch, the program further causes the processor to identify the first patch based on location of a pointing feature displayed on a display device; and
   wherein when the processor assigns the first patch, the program further causes the processor to identify the first subsurface horizon based on location of a pointing feature displayed on a display device.

* * * * *